US009748881B2

United States Patent
Wu

(10) Patent No.: US 9,748,881 B2
(45) Date of Patent: Aug. 29, 2017

(54) VOLTAGE REGULATOR, OPERATION METHOD THEREOF, VOLTAGE REGULATING SYSTEM, AND MOBILE VEHICLE

(71) Applicants: UNIVERSAL SCIENTIFIC INDUSTRIAL ( SHANGHAI ) CO., LTD., Shanghai (CN); UNIVERSAL GLOBAL SCIENTIFIC INDUSTRIAL CO., LTD., Nantou County (TW)

(72) Inventor: Hsin-Hung Wu, Nantou County (TW)

(73) Assignees: UNIVERSAL SCIENTIFIC INDUSTRIAL (SHANGHAI) CO., LTD., Shanghai (CN); UNIVERSAL GLOBAL SCIENTIFIC INDUSTRIAL CO., LTD., Nantou County (TW)

( * ) Notice: Subject to any disclaimer, the term of this patent is extended or adjusted under 35 U.S.C. 154(b) by 789 days.

(21) Appl. No.: 14/246,569

(22) Filed: Apr. 7, 2014

(65) Prior Publication Data

US 2014/0361610 A1    Dec. 11, 2014

(30) Foreign Application Priority Data

Jun. 5, 2013    (TW) .............................. 102119909 A

(51) Int. Cl.
    *H02P 9/30*    (2006.01)
(52) U.S. Cl.
    CPC .................................... *H02P 9/302* (2013.01)
(58) Field of Classification Search
    None
    See application file for complete search history.

(56) References Cited

U.S. PATENT DOCUMENTS

| 5,747,909 A | 5/1998 | Syverson |
| 5,753,989 A | 5/1998 | Syverson |
| 5,886,500 A * | 3/1999 | Iwatani ................... H02J 7/245 320/104 |

FOREIGN PATENT DOCUMENTS

| CN | 200997583 Y | 12/2007 |
| CN | 101127504 A | 2/2008 |

(Continued)

OTHER PUBLICATIONS

China Patent Office, Office action issued on Mar. 28, 2016.
Taiwan Patent Office, Office action issued on Feb. 13, 2015.

*Primary Examiner* — Rexford Barnie
*Assistant Examiner* — Swarna N Chowdhuri
(74) *Attorney, Agent, or Firm* — Li & Cai Intellectual Property (USA) Office

(57) ABSTRACT

A voltage regulator, an operation method thereof, and a voltage regulating system, and a mobile vehicle are provided. The voltage regulator coupled to an alternator and a battery includes a voltage detection unit which is coupled to the alternator and a startup assisting unit. The voltage detection unit operatively generates an enable signal responsive to an output voltage of the alternator. The startup assisting unit is coupled to the alternator, the battery, and the voltage detection unit. The startup assisting unit operatively generates a first exciting current to excite a rotor coil according to the enable signal. When the voltage detection unit detects that the output voltage is greater than a predetermined voltage threshold, the voltage detection unit outputs the enable signal causing the startup assisting unit to generate the first exciting current to the rotor coil, thereby facilitating the alternator to establish voltage under low rotational speed.

15 Claims, 6 Drawing Sheets

(56) References Cited

FOREIGN PATENT DOCUMENTS

| | | |
|---|---|---|
| CN | 101958684 A | 1/2011 |
| CN | 201922950 U | 8/2011 |
| TW | 330353 | 4/1998 |
| TW | 346703 | 12/1998 |

\* cited by examiner

VOLTAGE REGULATOR, OPERATION METHOD THEREOF, VOLTAGE REGULATING SYSTEM, AND MOBILE VEHICLE

BACKGROUND OF THE INVENTION

1. Field of the Invention

The present invention relates to a voltage regulator; in particular, to a voltage regulator capable of self-startup, an operation method thereof, a voltage regulating system, and a mobile vehicle.

2. Description of Related Art

It is known that car-used alternators can generate electrical power as soon as the engine connected thereto starts. The electrical power generated is further supplied to charge a battery and to power other electrical equipment in the car. In practice, a voltage regulator is used for controlling the operation of the alternator such that the output voltage generated by the alternator can be maintained within a specific operating voltage range.

In brief, a voltage regulator in general is connected to the output terminals of an alternator through a warning lamp and a starter switch. The voltage regulator can operatively receive a current supplied by the warning lamp when the car starts. Specially, the magnitude of current flowing through the rotor coil of the alternator can be adjusted by controlling the operation of a power switch so as to regulate the electric power generated by the alternator. When the output voltage outputted by the alternator is too high, the voltage regulator reduces the on duration in an operation cycle of the power switch to reduce the rotor coil current; when the output voltage outputted by the alternator is too low, the voltage regulator increases the on duration in the operation cycle of the power switch and adjusts the magnitude of the current flowing through the rotor coil so as to adjust the electrical power generated by the alternator. Accordingly, the voltage regulator can be used for stabilizing the output voltage of the alternator so as to ensure the supplied electrical power can be maintained at a sufficient amount such that the electrical equipment in a car can operate normally.

A conventional voltage regulator relies on a 3 W warning lamp powered by a battery to provide a sufficient exciting current exciting the rotor coil so that the alternator to generate electrical power when a car starts. Existing cars have begun to replace 3 watts warning lamp with 2 watts warning lamp or high luminance light emitting diodes (LEDs). Nevertheless, starting the alternator by either using an warning lamp of low wattage or not connect to the warning lamp and just using the internally generated self-exciting current to generate supply current provides insufficient exciting current to the rotor coil causing the alternator unable to operate under low rotational speed. That is, the alternator can only operate with sufficient amount of exciting current to establish voltage and supply power under high rotational speed.

SUMMARY OF THE INVENTION

Accordingly, the present invention provides a voltage regulator, an operation method thereof, a voltage regulating system, and a mobile vehicle, in which the voltage regulator can operatively generate an additional exciting current to excite the rotor coil of the alternator when an alternator start to operate using a built-in startup assisting unit, so that the alternator can quickly establish voltage under a low rotational speed.

An exemplary embodiment of the present invention provides a voltage regulator, which is coupled to an alternator and a battery. The voltage regulator comprises a voltage detection unit and a startup assisting unit. The voltage detection unit is coupled to an alternator and a battery. The voltage detection unit is configured for operatively detecting an output voltage of the alternator to generate an enable signal. The startup assisting unit is coupled to the voltage detection unit, the rotor coil of the alternator, and the battery. The startup assisting unit operatively receives a supply voltage of the battery and generates a first exciting current to excite the rotor coil responsive to the enable signal. When the voltage detection unit detects that the output voltage is greater than a predetermined voltage threshold, the voltage detection unit outputs the enable signal to cause the startup assisting unit to generate the first exciting current to the rotor coil of the alternator, so that the alternator is able to establish a voltage under a low rotational speed.

According to an exemplary embodiment of the present invention, the voltage detection unit is coupled to one of multiple exciting diodes in a rectifying unit of the alternator to receive the output voltage.

According to an embodiment of the present invention, the voltage detection unit is coupled to the rotor coil to receive the output voltage.

An exemplary embodiment of the present invention further provides a voltage regulating system, and the voltage regulating system comprises an alternator, a battery, a starter unit, and the aforementioned voltage regulator.

An exemplary embodiment of the present invention further provides a mobile vehicle, which comprises a main body, an alternator, a battery, a starter unit, and the aforementioned voltage regulator. The alternator is mounted on the main body, and the alternator includes a rotor coil. The alternator operatively generates an output voltage. The battery is coupled to the alternator, and is configured for outputting a supply voltage. The starter unit includes a starter switch, which is coupled to the battery and the alternator. The voltage regulator is mounted on the main body and is coupled to the alternator and the battery.

An exemplary embodiment of the present invention provides an operation method of a voltage regulator, and the method comprises the following steps. The output voltage of an alternator is first detected. Whether the output voltage of the alternator is greater than a predetermined voltage threshold is subsequently determined. When the output voltage is determined to be greater than the predetermined voltage threshold, causes the startup assisting unit to generate a first exciting current to the rotor coil of the alternator.

Summing up the above, the voltage regulator, the operation method thereof, the voltage regulating system, and the mobile vehicle provided in the embodiments of the present invention, which can operate in a self-starting manner and actively supply a sufficient pre-exciting current to an alternator when the alternator begins to operate through the build-in self-startup circuit. So that the alternator can be able to quickly and successfully establish voltage under a low rotational speed thereby increase the operation efficiency of the alternator.

DETAILED DESCRIPTION OF THE PREFERRED EMBODIMENTS

The main object of the present invention is to provide a voltage regulator capable of self-startup, and the voltage regulator, which can facilitate an alternator connected therewith to quickly establish voltage under a low rotational speed. The detailed architecture of the alternator is not an emphasis aspect of the present invention, and the architecture and operation principle of the alternator are well known arts to those skilled in the art, thus the detail technical descriptions are hereby omitted and only the aspects related to the present invention would be mentioned.

Figure 1:
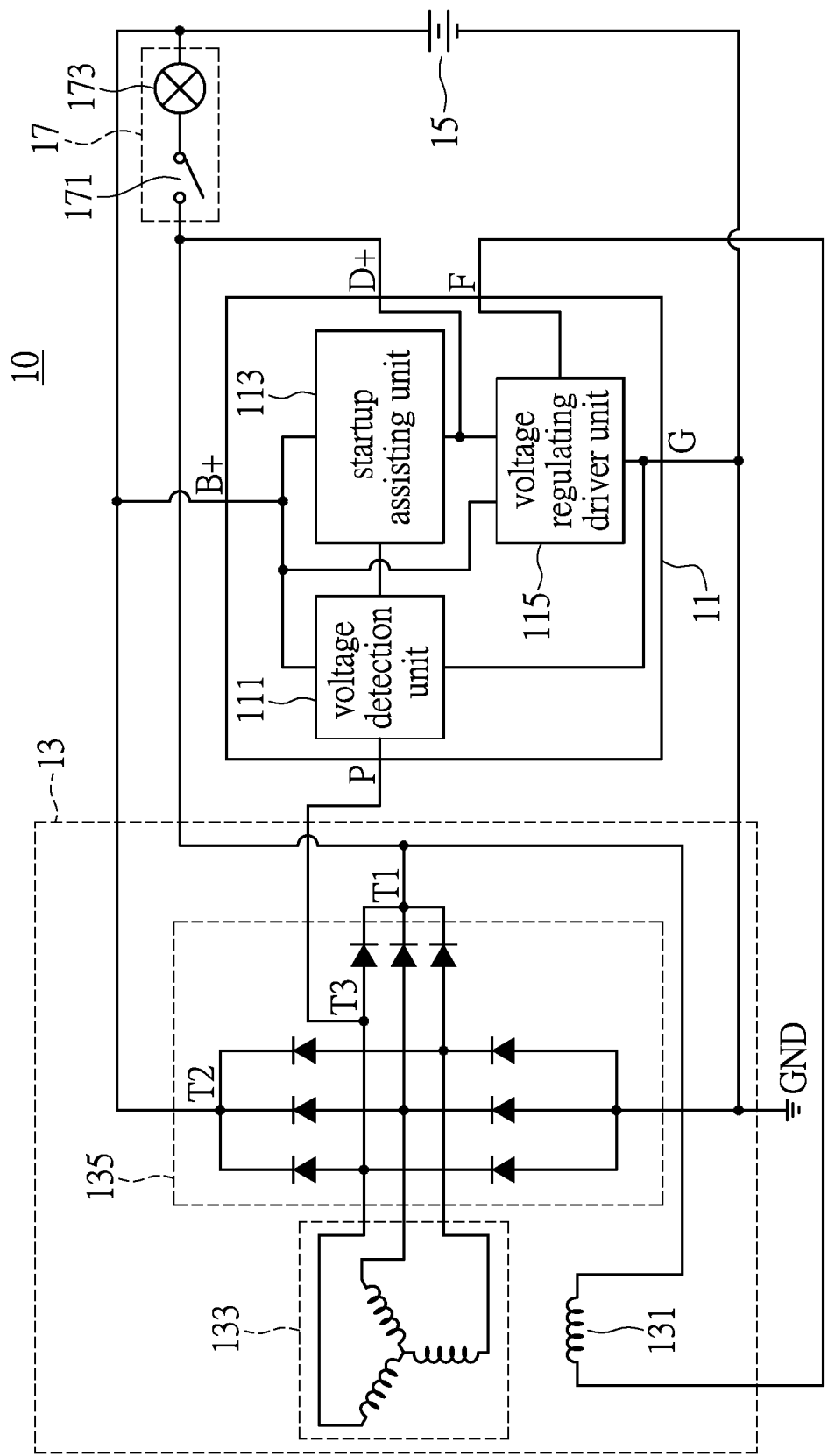
FIG. 1 is a schematic diagram of a voltage regulating system provided according to an exemplary embodiment of the present invention.

Please refer to FIG. 1. FIG. 1 shows a schematic diagram of a voltage regulating system provided according to an exemplary embodiment of the present invention. The voltage regulating system 10 can be used in a mobile vehicle (not shown), e.g., a car or a motorcycle. The voltage regulating system 10 includes a voltage regulator 11, an alternator 13, a battery 15, and a starter unit 17. The exact power supplying structure of the voltage regulating system 10 may depend upon the specification of the battery 15. In practice, the battery 15 can be implemented by a rechargeable battery e.g., 12V or 24V rechargeable battery.

In the instant embodiment, the voltage regulator 11 is a 5-pin voltage regulator having self-startup capability. The voltage regulator 11 has a power terminal B+, a positive field terminal D+, a field excitation terminal F, a voltage detection terminal P, and a ground terminal G. The alternator 13 has a first output terminal T1, a second output terminal T2, a third output terminal T3, and a ground terminal G. The alternator 13 further includes a rotor coil 131, a three-phase stator coil 133, and a rectifying unit 135. The starter unit 17 further includes a starter switch 171 and a warning lamp 173. The warning lamp 173 can be implemented by one or more light emitting diodes (LED) connected in series/parallel, or a 2 W lamp. It shall be noted that in the instant embodiment, it is not necessary for the voltage regulator 11 and the alternator 13 to connect the warning lamp 173. In other embodiments, the voltage regulator 11 and the alternator 13 can be configured to connect the battery 15 through the starter switch 171 only.

As shown in FIG. 1, the three-phase stator coil 133 of the alternator 13 is electrically connected to the rectifying unit 135. The rectifying unit 135 of the alternator 13 is respectively connected to the first output terminal T1, the second output terminal T2, and the ground terminal G. The rectifying unit 135 of the alternator 13 includes a rectifier and three exciting diodes. The rectifier is a three-phase rectifier which comprises of three pairs of two series-connected rectifying diodes. The three-phase rectifier is configured for rectifying the three-phase alternating current (AC) generated by the three-phase stator coil 133. Each pair of two series-connected rectifying diodes is further series-coupled between the second output terminal T2 and the ground terminal G. The three exciting diodes are respectively coupled between the three-phase stator coil 133 and the first output terminal T1. Specifically, the anode of each exciting diode is coupled to one phase coil of the three-phase stator coil 133 while the cathode of each exciting diode is coupled to the first output terminal T1, respectively.

The first output terminal T1 of the alternator 13 is electrically connected to a first end of the rotor coil 131 and the positive field terminal D+ of the voltage regulator 11. The first output terminal T1 is configured for providing an exciting current to the rotor coil 131 under the normal operation of the alternator 13. The first output terminal T1 of the alternator 13 is further connected to a positive terminal of the battery 15 through the starter switch 171 and the warning lamp 173. The second output terminal T2 of the alternator 13 is electrically connected to the positive terminal of the battery 15 so that the second output terminal T2 can operatively charge the battery 15 and maintain the operations of other electrical equipment on the mobile vehicle when the alternator 11 operates normally. The structure and related operation method of the three-phase stator coil 133 and the rectifying unit 135 of the alternator 13 are known arts to those skilled in the art, and thus further description are hereby omitted.

The power terminal B+ of the voltage regulator 11 is electrically connected to the positive terminal of the battery 15. The positive field terminal D+ of the voltage regulator 11 is series-connected to the positive terminal of the battery 15 through the starter switch 171 and the warning lamp 173. The positive field terminal D+ is further electrically connected to the first output terminal T1 of the alternator 13. The field excitation terminal F is electrically connected to a second end of the rotor coil 131, and is electrically connected to the first output terminal T1 of the alternator 13 through the rotor coil 131. The rotor coil 131 of the alternator 13 is electrically connected between the positive field terminal D+ and the field excitation terminal F of the voltage regulator 11. The voltage detection terminal P is electrically connected to the third output terminal T3 of the alternator 13. In addition, the ground terminal G of the alternator 13, the ground terminal G of the voltage regulator 11 and a negative terminal of the battery 15 are connected to a ground GND.

To describe further, the voltage regulator 11 includes a voltage detection unit 111, a startup assisting unit 113, and a voltage regulating driver unit 115. The voltage detection unit 111 is coupled to the startup assisting unit 113. The startup assisting unit 113 is coupled to the voltage regulating driver unit 115.

The voltage detection unit 111 is coupled to the third output terminal T3 of the alternator 13 through the voltage detection terminal P to detect the voltage level of a phase signal outputted by the third output terminal T3 of the alternator 13. The voltage detection unit 111, the voltage regulating driver unit 115, and the startup assisting unit 113 are coupled to the battery 15 through the power terminal B+ for receiving the supplying voltage from the battery 15. The junction point (i.e., the positive field terminal D+) formed between the startup assisting unit 113 and the voltage regulating driver unit 115 is coupled to the first end of the rotor coil 131. The voltage regulating driver unit 115 is coupled to the second end of the rotor coil 131 through the field excitation terminal F. The voltage detection unit 111 and the voltage regulating driver unit 115 are connected to the ground through the ground terminal G.

When the voltage detection unit 111 detects that the voltage level of the phase signal outputted from the third terminal T3 of the alternator 13 is greater than a predetermined voltage threshold, the voltage detection unit 111 operatively outputs the enable signal causing the startup assisting unit 113 to start operate. The predetermined voltage threshold may be configured according to the exact structure and operation requirements of the alternator 13, and the present invention is not limited thereto. In the instant embodiment, the predetermined voltage threshold may be configured between 0.1 V and 0.5 V. In other words, the voltage detection unit 111 can through detecting the output voltage of the third output terminal T3 determine whether the alternator 13 starts to operate.

The startup assisting unit 113 operatively generates a first exciting current responsive to the enable signal and the supply voltage from the battery 15, and The startup assisting unit 113 outputs the first exciting current to the rotor coil 131 through the positive field terminal D+ to generate magnetic field, wherein the startup assisting unit 113 can regulate the magnitude of the first exciting current according to the application and operational requirements of the voltage regulator 11 in the related market.

Additionally, when the startup assisting unit 113 is unable to output the first exciting current, for example, when the startup assisting unit 113 detects that the output voltage at the first output terminal T1 of the alternator 13 has increased to a cut-off voltage of the startup assisting unit 113 through the positive wiring terminal D+, the startup assisting unit 113 automatically stops to operate i.e., turns off and discontinue outputting the first exciting current.

The voltage regulating driver unit 115 operatively controls the on/off duration of a power switch Q1 in the operation cycle thereof according to the voltage at the power terminal B+ (i.e., the output voltage of the second output terminal T2 of the alternator 13) after the alternator 13 has completed the voltage establishing process to generate a second exciting current to further excite the rotor coil 131 so as to regulate the output voltage at the second output terminal T2 of the alternator 13.

The upper operating voltage limit and the lower operating voltage limit described in the present invention may be configured according to actuarial structure and operation requirements of the alternator 13 and the battery 15. The voltage regulating driver unit 115 is the voltage regulation circuit for the alternator 13, and the exact structure of the voltage regulation circuit and the associated operations for regulating the alternator 13 are known techniques to those skilled in the art, and further descriptions are hereby omitted.

A brief description for the operation principle of a voltage regulating system 10 is provided. When a user switches on the starter switch 171 of the starter unit 17, i.e., the moment that starter switch 171 turns on, the warning lamp 173 electrically connects to the battery 15 through the starter switch 171 and generates a small amount of current to the rotor coil 131 through the starter switch 171. At this time, the electrical equipment in a car is powered by the supplying voltage of the battery 15, while the current generated by the warning lamp 173 causes the three-phase stator coil 133 of the alternator 13 to operate and generate a small amount of voltage. At the same time, the voltage detection unit 111 operatively receives and detects the voltage level of the phase signal outputted from the third output terminal T3 of the alternator 13 through the voltage detection terminal P.

When the voltage detection unit 111 detects that the voltage level at the third output terminal T3 is greater than a predetermined voltage threshold (e.g., 0.2 V), the startup assisting unit 113 instantly generates a sufficient first exciting current to excite the rotor coil 131 and generated a magnetic field to drive the alternator 13 to operate and establish voltage. The three-phase alternating voltage generated by the three-phase stator coil 133 of the alternator 13 is further rectified by the rectifying unit 135 and respectively outputted to the positive field terminal D+ of the voltage regulator 11 and the battery 15 through the first output terminal T1 and the second output terminal T2 to maintain the operations of the alternator 13, the battery 15, and other electrical equipment in the mobile vehicle.

When the alternator 13 starts to operate, the rotational speed increases, and the output voltage increases along with the rotational speed. When the voltage of the positive field terminal D+(i.e., the first output terminal T1) increases to the cut-off voltage of the startup assisting unit 113, the startup assisting unit 113 immediately stops to operate to discontinue outputting the first exciting current. At this time, the voltage regulating driver unit 115 regulates the magnitude of the second exciting current through configuring the on/off duration of the power switch so as to regulate the electrical power generated by the alternator 13. The second exciting current path is formed from the first output terminal T1, the positive field terminal D+, the rotor coil 131, the field excitation terminal F to the ground terminal G. The output voltage of the second output terminal T2 is configured to charge the battery 15 and to power other electrical equipment in a mobile vehicle.

In other embodiments, the voltage detection terminal P of the voltage regulator 11 can also electrically connect to any of the three exciting diodes of the rectifying unit 135 by connecting to the respective output line to detect the voltage level of any phase signal in a three-phase alternating signal, so long as the output voltage of the alternator 13 can be detected.

In short, the present invention can improve the issue that the current warning lamp 173 being unable to provide sufficient exciting current to excite the rotor coil to drive the alternator 13 when a car starts by disposing a built-in startup assisting unit 113.

Figure 2:
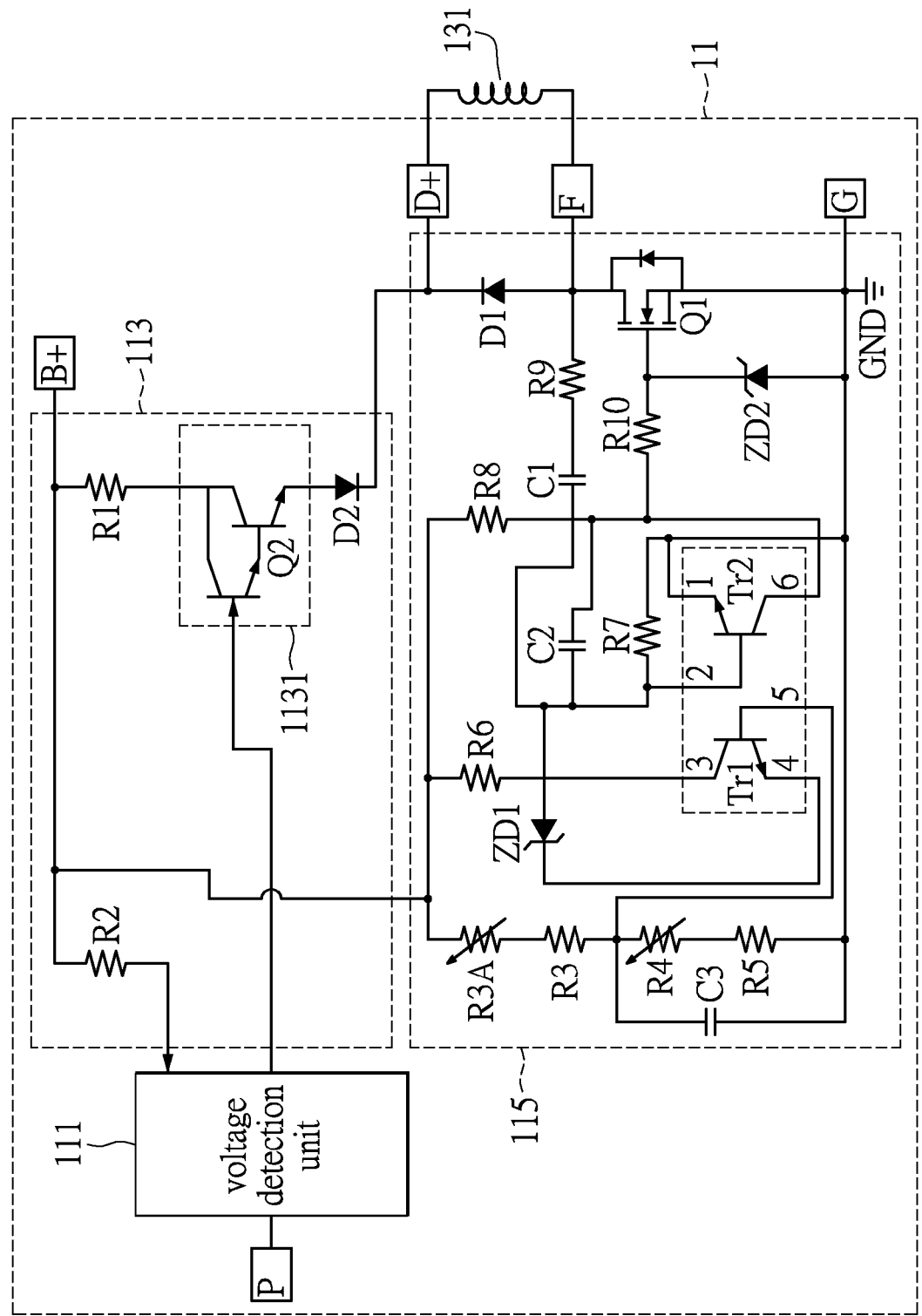
FIG. 2 is a detailed schematic diagram of a 5-pin voltage regulator provided according to an exemplary embodiment of the present invention.
Figure 3:
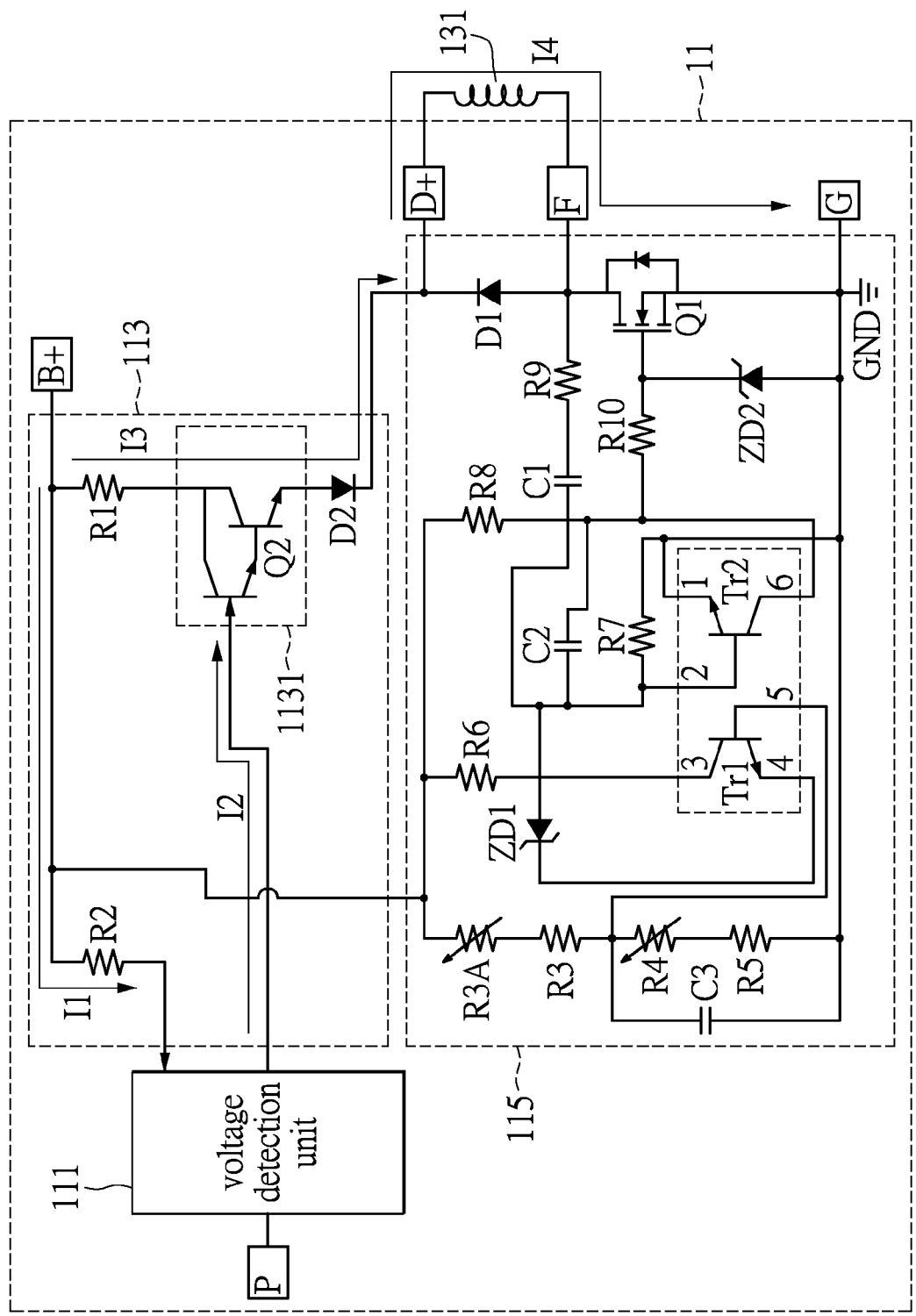
FIG. 3 is a diagram of a 5-pin voltage regulator in operation provided according to an exemplary embodiment of the present invention.

The present embodiment further provides a detailed circuitry diagram of the 5-pin voltage regulator, and the startup assisting unit 113. Please refer to FIG. 1, FIG. 2, and FIG. 3 at the same time. FIG. 2 shows a detailed schematic diagram of the 5-pin voltage regulator provided according to the instant embodiment of the present invention. FIG. 3 shows a diagram of a 5-pin voltage regulator in operation provided according to the instant embodiment of the present invention.

The startup assisting unit 113 includes a current amplifying unit, a first resistive element, a second resistive element, and a current-direction limiting element. The current amplifying unit is coupled to the first resistive element, the second resistive element, and the current-direction limiting element. The current amplifying unit has an input terminal, an output terminal, and a control terminal. The current amplifying unit is configured for operatively adjusting the magnitude of the first exciting current I3 responsive to the voltage level of the enable signal.

In the instant embodiment, the current amplifying unit includes an N type Darlington transistor Q2; the first resistive element includes a resistor R1; the second resistive element includes a resistor R2; the current direction limiting element includes a diode D2.

One end of the resistor R1 is electrically connected to the power terminal B+ and the other end thereof is electrically connected to a collector of the NPN Darlington transistor Q2. In other words, the collector of the NPN Darlington transistor Q2 receives the supplying voltage from the battery 15 through the resistor R1 and the power terminal B+. One end of the resistor R2 is electrically connected to the power terminal B+ and the other end thereof is electrically connected to the voltage detection unit 111. The base of the NPN Darlington transistor Q2 is electrically connected to the voltage detection unit 111 to receive the enable signal. An emitter of the NPN Darlington transistor Q2 is electrically connected to an anode of the diode D2. A cathode of the diode D2 is electrically connected to the positive field terminal D+. The diode D2 is configured for preventing high voltage from the positive field terminal D+ from damaging the NPN Darlington transistor Q2.

The circuit of the voltage regulating driver unit 115 as shown in FIG. 2 is configured for controlling the on/off duration of the power switch Q1 in the operation cycle of the power switch Q1 (i.e., duty cycle of the power switch Q1) according to the voltage of the positive field terminal D+ to correspondingly generate the second exciting current I4 to adjust the strength of the magnetic field generated as the rotor coil 131 excites, so as to regulate the output voltage of the alternator 13.

Next, a detailed description for the main operational principle of the voltage regulator 11 is provided in the following paragraph.

When a car starts, the voltage detection unit 111 start to detect the output voltage of the alternator 13, through the voltage detection terminal P. For example, when the voltage level of the phase signal outputted by the third output terminal T3 in FIG. 1 is greater than the predetermined voltage threshold (e.g., 0.2 V), the voltage detection unit 111 operatively outputs the enable signal causing the NPN Darlington transistor Q2 of the startup assisting unit 113 to turn on as the voltage across the base and the emitter is greater than a conducting voltage of the NPN Darlington transistor Q2 (e.g., 1.4V).

At this time, the NPN Darlington transistor Q2 conducts forming a first exciting current path and provides the first exciting current I3 to the rotor coil 131 to assist the alternator 13 in establishing voltage under a low rotational speed. The first exciting current path as shown in FIG. 3 is formed from the power terminal B+ through the NPN Darlington transistor Q2, the diode D2, the positive field terminal D+, the rotor coil 131, the field excitation terminal F to the ground terminal G. The voltage detection unit operatively regulates the voltage level of the enable signal according to the input current I1 outputted from the battery 15 through the resistor R2, so as to cause the NPN Darlington transistor Q2 to generate the first exciting current I3. The magnitude of the first exciting current I3 is mainly adjusted by the resistance of the resistor R1, and can be configured according to actual application requirements of the voltage regulator 11. Accordingly, the alternator 13 can be able to quickly establish voltage under a low rotational speed.

Next, when the voltage of the positive field terminal D+ increase to the cut-off voltage of the startup assisting unit 113 due to operation of the alternator 13, the NPN Darlington transistor Q2 cuts off as the voltage difference between the base voltage (i.e., the voltage level of the enable signal outputted by the voltage detection unit 111) and the emitter voltage (i.e., the voltage of the positive field terminal D+) becomes smaller than the conducting voltage (e.g., 1.4 V) of the NPN Darlington transistor Q2, causing the startup assisting unit 113 stops to operate.

The cut-off voltage of the startup assisting unit 113 of the present invention may be configured according to the circuit structure of the startup assisting unit 113 and the operation of the alternator 13, and the present invention is not limited thereto. Specifically, the cut-off voltage of the startup assisting unit 113, for example, may be one half of the supplying voltage provided by the battery 15. Taking a 24 V power supplying system as an example, when the startup assisting unit 113 detects that the output voltage at the first output terminal T1 of the alternator 13 is greater than or equal to 12 V or approaching to 12 V, the startup assisting unit 113 automatically disable and stop to operate.

When the voltage regulating driver unit 115 detects that the output voltage at the second output terminal T2 has exceeded the upper operating voltage limit of the alternator 13 through the power terminal B+, the voltage regulating driver unit 115 reduces the second exciting current I4 by shortening the on duration in the operating cycle of the power switch Q1 (i.e. reduces the duty cycle of the power switch) to reduce the electricity of the rotor coil 131 so as to reduce the output voltage of the alternator 13 is reduced. When the voltage regulating driver unit 115 detects that the output voltage at the second output terminal T2 is lower than the lower operating voltage limit of the alternator 13 through the power terminal B+, the voltage regulating driver unit 115 increases the second exciting current I4 by increasing the on duration in an operating cycle of the power switch Q1 (i.e. increases the duty cycle of the power switch) to increase the output voltage of the alternator 13, i.e., the output voltage of the second output terminal T2.

The voltage regulator 11 can supply a sufficient exciting current with the build-in self-startup circuit to drive the alternator 13 upon detecting that alternator 13 begins to operate, such that the alternator 13 can be able to quickly establish voltage under a low rotational speed. Moreover, the voltage regulator 11 can automatically stop the operation of the built-in self-startup circuit after the alternator 13 has established voltage to reduce the overall power consumption of the voltage regulator 11.

In the present invention, the resistive elements, such as resistor R1~R10 may be manufactured using conductive ink. The power switch Q1 may be an N-type power MOSFET, a MOSFET, a P-type power MOSFET, a Darlington transistor, or an Insulation Gate Bipolar Transistor (IGBT), and the present invention is not limited to the examples provided herein.

Figure 4:
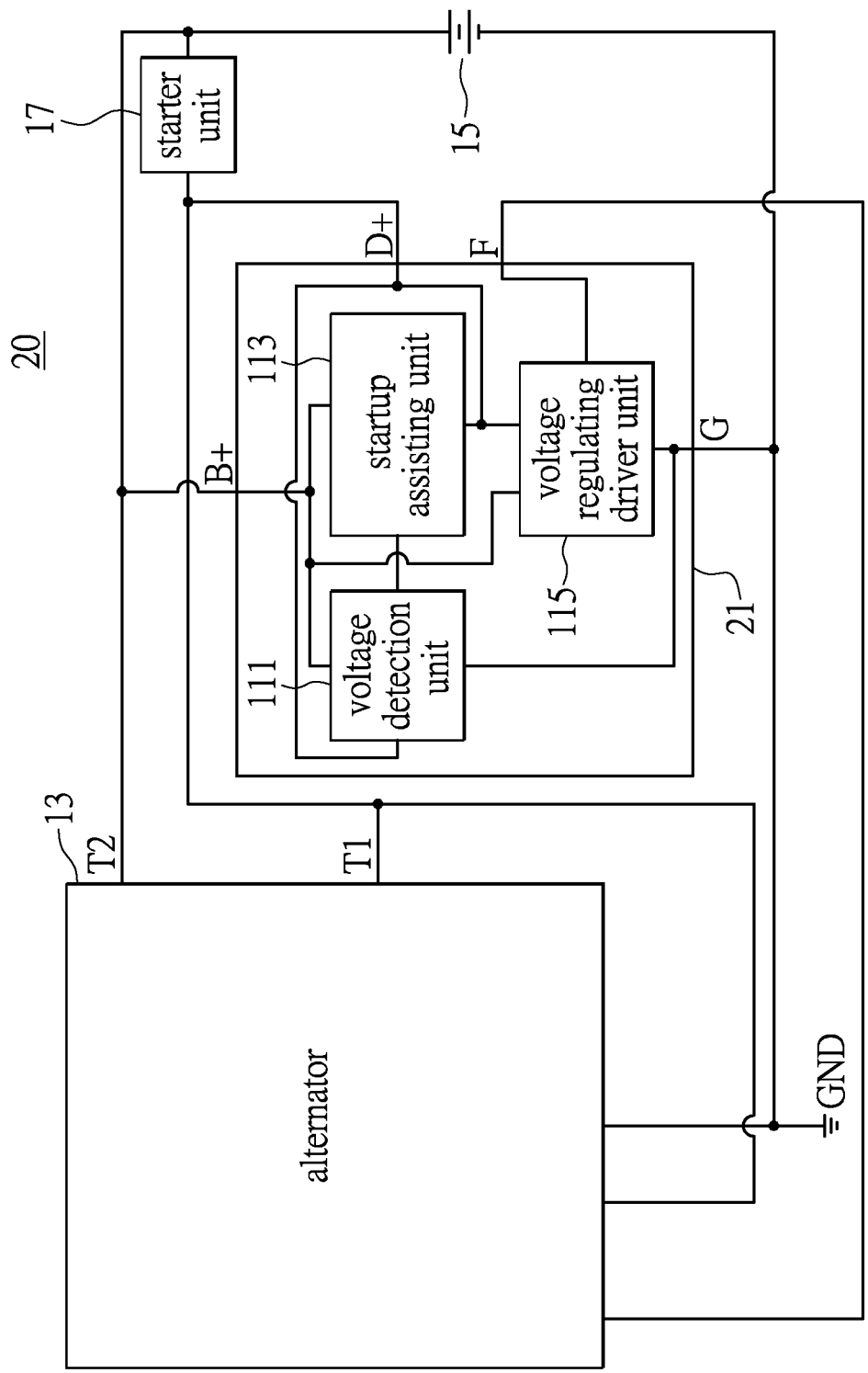
FIG. 4 is a diagram of a voltage regulating system provided according to another exemplary embodiment of the present invention.

Please refer to FIG. 4 in conjunction with FIG. 1. FIG. 4 shows a diagram illustrating a voltage regulating system provided according to another exemplary embodiment of the present invention.

The difference between FIG. 4 and FIG. 1 is in that the voltage regulator 21 of the voltage regulating system 20 is 4-pin voltage regulator. The voltage regulator 21 has a power terminal B+, a positive field terminal D+, a field excitation terminal F, and a ground terminal G. The voltage detection unit 111 is electrically connected to the positive field terminal D+ for detecting the output voltage of the first output terminal T1 of the alternator 13. That is, the voltage detection unit 111 activates the startup assisting unit 113 responsive to voltage of the positive field terminal D+ detected (i.e., the output voltage of the first output terminal T1 of the alternator 13). When voltage detection unit 111 detects that the output voltage of the first output terminal T1 is greater than a predetermined voltage threshold, the voltage detection unit 111 outputs an enable signal to cause the startup assisting unit 113 to generate a first exciting current to the rotor coil 131 to drive the alternator 13.

As the voltage of the positive field terminal D+ (i.e., the first output terminal T1 of the alternator 13) and the voltage at the voltage detection terminal P (i.e., the third output terminal T3 of the alternator 13) is differed by a voltage drop of an exciting diode, hence the voltage detection sensitivity of the positive field terminal D+ in the instant embodiment is lower than voltage detection sensitivity of the voltage detection terminal P. Accordingly, the predetermined voltage threshold of the present embodiment shall be lower than predetermined voltage threshold of the previous embodiment such as 0.1 V to increase detection sensitivity.

However, the voltage detection unit 111 in the present embodiment can be configured to directly connect to the positive field terminal D+, so that there is no need for to add an additionally terminal on the voltage regulator 21. Accordingly, the operational risk and production cost of the voltage regulator 21 can be effectively reduced. Since it is known in the arts that the more terminals the voltage regulator 21 of a car has, the more risk it will be subjected to, for example, the occurrence probability of short circuit will be increased.

The rest of the circuitry structure of the voltage regulator 21 in the voltage regulating system 20 are essentially the same as the voltage regulator 11 of the voltage regulating system 10, and those skilled in the art shall be able to infer the operation of the voltage regulator 21 based on the above explanation, hence further descriptions are therefore omitted. In addition, those skilled in the art should also be able to choose a 4-pin or a 5-pin voltage regulator for regulating the operation of the alternator 13 based on the actual structure and/or operational requirement of the alternator 13 for a car.

The voltage regulator having a built-in self-starting assistant circuit regulate the operation of the alternator based on the detection of the voltage at the second output terminal of the alternator after the alternator has completed the voltage establish process. However, the voltage regulator may also regulate the operation of the alternator through detecting the voltage at the first output terminal of the alternator according to actual product application requirements. Please refer to FIG. 5 along with FIG. 1.

Figure 5:
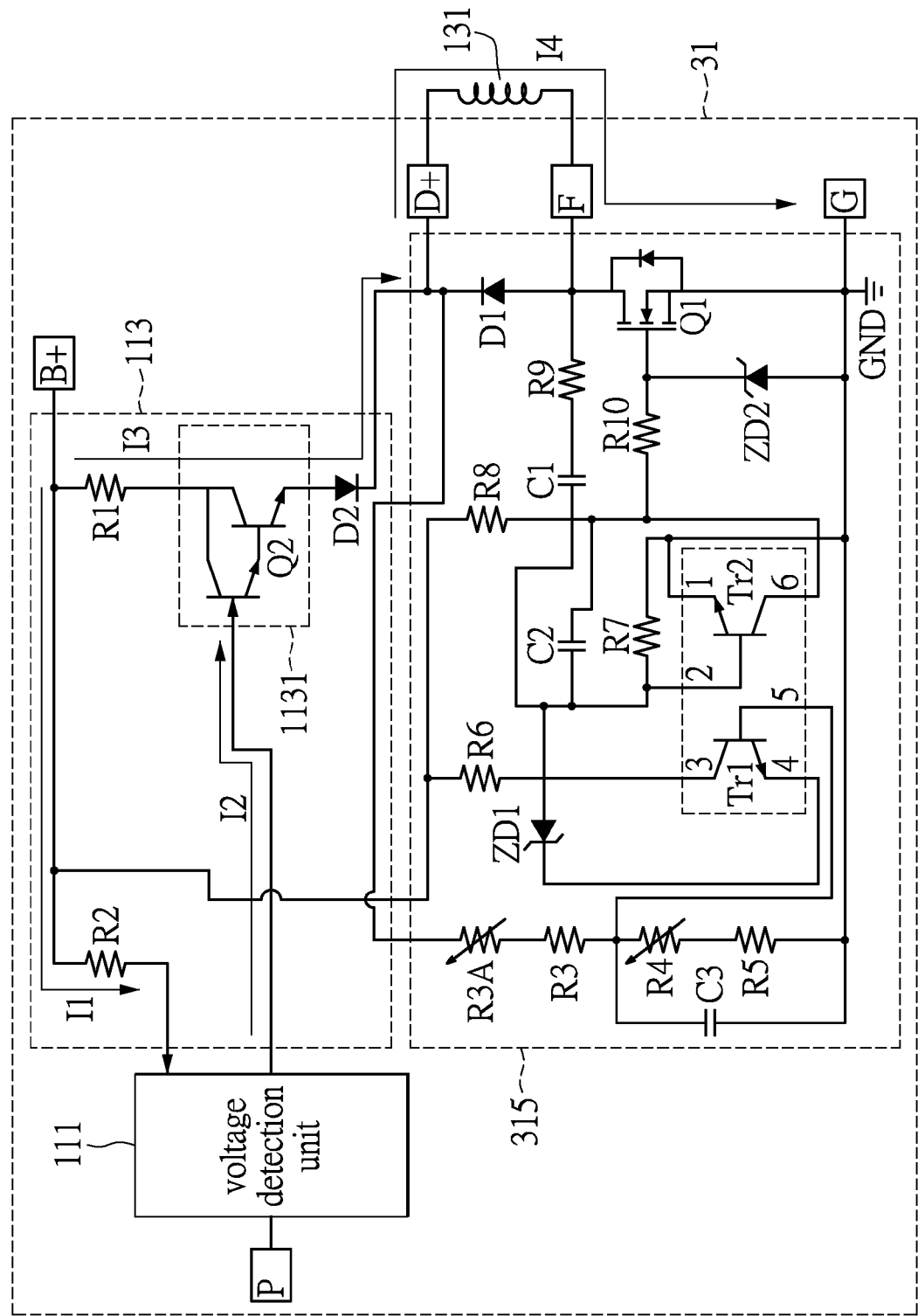
FIG. 5 shows a diagram of a 5-pin voltage regulator in operation provided according to another exemplary embodiment of the present invention.

FIG. 5 shows a diagram of a 5-pin voltage regulator in operation provided according to another exemplary embodiment of the present invention. The voltage regulator has a power terminal B+, a positive field terminal D+, a field excitation terminal F, a voltage detection terminal P, and a ground terminal G. The alternator 13 has a first output terminal T1, a second output terminal T2, a third output terminal T3, and a ground terminal G.

The difference between FIG. 5 and FIG. 1 is in that the voltage regulating driver unit 315 of the voltage regulator 31 in FIG. 5 is coupled to the first output terminal T1 of the alternator 13 through the positive field terminal D+. The voltage regulating driver unit 315 is further coupled to the rotor coil (not shown in FIG. 5) through the field excitation terminal F. Such that the voltage regulating driver unit 315 of the voltage regulator 31 can detect the output voltage at the first output terminal T1 of the alternator 13 through the positive wiring terminal D+ after the alternator 13 has established voltage. The voltage regulator 31 controls the ratio of between on/off duration of the power switch Q1 in the operation cycle of the power switch Q1 according to the voltage detected at the positive field terminal D+ to correspondingly generate a second exciting current I4 exciting the rotor coil 131 and regulating the operation of the alternator 13.

Figure 6:
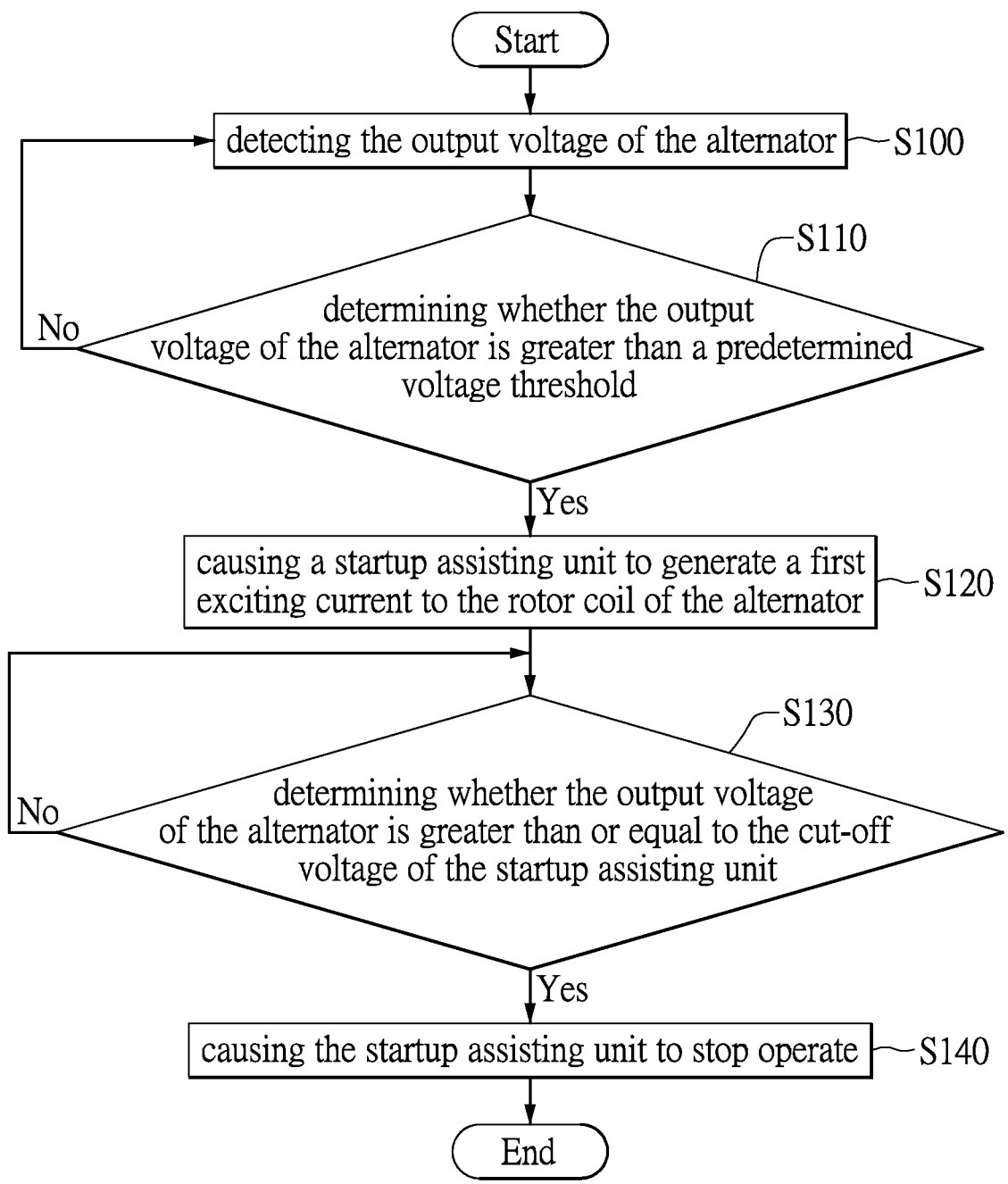
FIG. 6 shows a flowchart of an operation method for a voltage regulator provided according to an exemplary embodiment of the present invention.

FIG. 6 shows a flowchart illustrating an operation method for a voltage regulator provided according to an exemplary embodiment of the present invention. Please refer to FIG. 6 in conjunction with FIG. 1 and FIG. 2.

In Step S100, the voltage detection unit 111 of the voltage regulator is driven to detect the output voltage of the alternator 13. The output voltage in the instant embodiment may be the output voltage at the first output terminal T1 of the alternator 13 or the output voltage at the third output terminal T3 of the alternator 13.

Next, in Step S110, the voltage detection unit 111 of the voltage regulator 11 determines whether the output voltage of the alternator 13 is greater than a predetermined voltage threshold when the voltage detection unit 111 determines that the output voltage of the alternator 13 is greater than a predetermined voltage threshold, executes Step S120. Conversely, when the voltage detection unit 111 determines that the output voltage of the alternator 13 is less than a predetermined voltage threshold, returns to Step S100. The predetermined voltage threshold in the instant embodiment may be configured between 0.1 V and 0.5 V.

In Step S120, the voltage detection unit 111 operatively outputs an enable signal causing the startup assisting unit 113 to generate a first exciting current to excite the rotor coil 31 of the alternator 13, so as to drive the alternator 13.

Next, in Step S130, the startup assisting unit 113 operatively determines whether the output voltage at the first output terminal T1 of the alternator 13 is greater than or equal to the cut-off voltage of the startup assisting unit 113 through the positive field terminal D+. When the startup assisting unit 113 determines that the output voltage at the first output terminal T1 of the alternator 13 is greater than or equal to the cut-off voltage of the startup assisting unit 113, executes Step S140. Conversely, when he startup assisting unit 113 determines the output voltage at the first output terminal T1 of the alternator 13 is still less than the cut-off voltage of the startup assisting unit 113, returns to Step S130, i.e., the startup assisting unit 113 continues to generate the first exciting current and detect the output voltage of the alternator 13.

In Step S140, when the startup assisting unit 113 determines that the output voltage at the first output terminal T1 of the alternator 13 is greater than or equal to the cut-off voltage of the startup assisting unit 113 (i.e., the alternator 13 has successfully established voltage through the positive field terminal D+), the startup assisting unit 113 automatically stop to operate to cut off the current path of the first exciting current. In other words, the startup assisting unit 113 can automatically cut off after operate for a period of time thereby reduce the overall power consumption of the voltage regulator 11.

Then, when the alternator 13 operates normally and generates electrical power successfully, the voltage regulating driver unit 115 regulate and controls the on/off time duration ratios in the operating cycle of the power switch according to the output voltage (e.g., the voltage at the second output terminal T2) of the alternator 13 to adjust the magnitude of the second exciting current outputted so as to correspondingly adjust the output voltage of the alternator 13.

Even though the instant embodiment of the above method is explained with a 5-pin voltage regulator, however, those skilled in the art should be able to deduce the operation method for the 4-pin voltage regulator 21 shown in FIG. 4 or to another 5-pin voltage regulator 31 shown in FIG. 5 based on the above explanation. FIG. 6 is merely used for explaining an operation mode of the voltage regulator 11 and the present invention is not limited thereto.

In summary, the present invention provides a voltage regulator, an operation method thereof, a voltage regulating system, and the mobile vehicle which can operate in a self-starting manner and actively supply a sufficient pre-exciting current to an alternator when the alternator begins to operate through the build-in self-startup circuit. Such that the alternator can be able to successfully establish voltage under a low rotation speed. Hence, the present invention can improve the issue that the current warning lamp being unable to provide sufficient exciting current to excite the rotor coil to drive the alternator. Accordingly, the power generation efficiency of the alternator can be effectively enhanced, while the power consumption of the battery can reduced during the startup of the alternator.

The descriptions illustrated supra set forth simply the preferred embodiments of the present invention; however, the characteristics of the present invention are by no means restricted thereto. All changes, alterations, or modifications conveniently considered by those skilled in the art are deemed to be encompassed within the scope of the present invention delineated by the following claims.

What is claimed is:

1. A voltage regulator, coupled to an alternator and a battery, the alternator having a first output terminal, a second output terminal and a third output terminal, the voltage regulator comprising:
   a voltage detection unit having a voltage detection terminal couple to the third output terminal of the alternator, the voltage detection unit coupled to the battery through a power terminal, the voltage detection unit operatively detecting a voltage level of a phase signal outputted by the third output terminal of the alternator and generating an enable signal; and
   a startup assisting unit coupled to the voltage detection unit, a rotor coil(131) of the alternator, and the battery; the startup assisting unit receiving a supplying voltage from the battery and operatively generating a first exciting current responsive to the enable signal for exciting the rotor coil;
   wherein when the voltage detection unit detects that the voltage level of the phase signal outputted by the third output terminal is greater than a predetermined voltage threshold, the voltage detection unit outputs the enable signal to cause the startup assisting unit to generate the first exciting current to the rotor coil of the alternator, so that the alternator is able to establish voltage under low rotational speed;
   wherein the startup assisting unit comprises:
   a first resistor, the first terminal of the first resistor being coupled to the battery;
   a second resistor, the first terminal of the second resistor being coupled to the battery and the second terminal of the second resistor being coupled to the voltage detection unit;
   a current amplifying unit having an input terminal, an output terminal and a control terminal, the input terminal being coupled to the second terminal of the first resistor, the output terminal being coupled to the rotor coil of the alternator, and the control terminal being coupled to the voltage detection unit to receive the enable signal; and
   a first diode, an anode thereof being coupled to the output terminal of the current amplifying unit, and an cathode thereof being coupled to the rotor coil of the alternator;
   wherein the current amplifying unit generates the first exciting current according to the enable signal.

2. The voltage regulator according to claim 1, wherein the current amplifying unit is a Darlington transistor.

3. The voltage regulator according to claim 1, wherein when the voltage level of the phase signal outputted by the third output terminal increases to a cut-off voltage of the startup assisting unit, the startup assisting unit automatically stops to operate.

4. The voltage regulator according to claim 1, wherein the voltage detection unit is coupled to one of multiple exciting diodes in a rectifying unit of the alternator to receive the voltage level of the phase signal outputted by the third output terminal.

5. The voltage regulator according to claim 1, further comprising:
   a voltage regulating driver unit coupled to the rotor coil of the alternator, operatively controlling the operation of a power switch according to the voltage level of the phase signal outputted by the third output terminal for correspondingly generating a second exciting current to excite the rotor coil, so as to regulate the output voltage of the alternator.

6. A voltage regulating system, comprising:
   an alternator, comprising a rotor coil, a first output terminal, a second output terminal, a third output terminal and a ground terminal; the alternator operatively generating a voltage level of a phase signal by the third output terminal;
   a battery coupled to the alternator, configured for outputting a supply voltage;
   a starter unit coupled to the battery and the alternator; and
   a voltage regulator coupled to the alternator and the battery, the voltage regulator comprising:
   a voltage detection unit having a voltage detection terminal coupled to the third output terminal of the alternator, operatively detecting the voltage level of the phase signal of the alternator and generating an enable signal; and
   a startup assisting unit coupled to the alternator, the rotor coil of the alternator, and the battery, the startup assisting unit receiving the supply voltage from the battery and operatively generating a first exciting current responsive to the enable signal for exciting the rotor coil;
   wherein, when the voltage detection unit detects that the voltage level of the phase signal of the alternator is greater than a predetermined voltage threshold, the voltage detection unit outputs the enable signal to cause the startup assisting unit to generate the first exciting current to the rotor coil of the alternator, so that the alternator is able to establish voltage under a low rotational speed;
   wherein the startup assisting unit comprises:
   a first resistor, the first terminal of the first resistor being coupled to the battery;
   a second resistor, the first terminal of the second resistor being coupled to the battery and the second terminal of the second resistor being coupled to the voltage detection unit;
   a current amplifying unit having an input terminal, an output terminal and a control terminal, the input terminal being coupled to the second terminal of the first resistor, the output terminal being coupled to the rotor coil of the alternator, and the control terminal being coupled to the voltage detection unit to receive the enable signal; and a first diode, an anode thereof being coupled to the output terminal of the current amplifying unit, and an cathode thereof being coupled to the rotor coil of the alternator;

wherein the current amplifying unit generates the first exciting current according to the enable signal.

7. The voltage regulating system according to claim 6, wherein the current amplifying unit is a Darlington transistor.

8. The voltage regulating system according to claim 6, wherein the voltage detection unit is coupled to one of multiple exciting diodes in a rectifying unit of the alternator to receive the voltage level of the phase signal outputted by the third output terminal.

9. The voltage regulating system according to claim 6, wherein when the voltage level of the phase signal outputted by the third output terminal increases to a cut-off voltage of the startup assisting unit, the startup assisting unit automatically stops to operate.

10. A mobile vehicle, comprising:
a main body;
an alternator mounted on the main body, the alternator comprising a rotor coil, a first output terminal, a second output terminal, a third output terminal and a ground terminal; the alternator operatively generating a voltage level of the phase signal outputted by the third output terminal;
a battery coupled to the alternator, configured for outputting a supply voltage;
a starter unit comprising a starter switch, the starter switch being coupled to the battery; and
a voltage regulator mounted on the main body, the voltage regulator coupled to the alternator and the battery, the voltage regulator comprising:
a voltage detection unit having a voltage detection terminal coupled to the third output terminal of the alternator, and operatively detecting the voltage level of the phase signal of the alternator and generating an enable signal; and
a startup assisting unit coupled to the alternator, the rotor coil of the alternator, and the battery, the startup assisting unit receiving the supply voltage from the battery and operatively generating a first exciting current responsive to the enable signal for exciting the rotor coil;
wherein, when the voltage detection unit detects that the voltage level of the phase signal of the alternator is greater than a predetermined voltage threshold, the voltage detection unit outputs the enable signal to cause the startup assisting unit to generate the first exciting current to the rotor coil of the alternator, so that the alternator is able to establish voltage under a low rotational speed;

wherein the startup assisting unit comprises:
a first resistor, the first terminal of the first resistor being coupled to the battery;
a second resistor, the first terminal of the second resistor being coupled to the battery and the second terminal of the second resistor being coupled to the voltage detection unit;
a current amplifying unit having an input terminal, an output terminal and a control terminal, the input terminal being coupled to the second terminal of the first resistor, the output terminal being coupled to the rotor coil of the alternator, and the control terminal being coupled to the voltage detection unit to receive the enable signal; and
a first diode, an anode thereof being coupled to the output terminal of the current amplifying unit, and an cathode thereof being coupled to the rotor coil of the alternator;
wherein the current amplifying unit generates the first exciting current according to the enable signal.

11. The mobile vehicle according to claim 10, wherein the current amplifying unit is a Darlington transistor.

12. The mobile vehicle according to claim 10, wherein the voltage detection unit is coupled to one of multiple exciting diodes in a rectifying unit of the alternator to receive the voltage level of the phase signal outputted by the third output terminal.

13. The mobile vehicle according to claim 10, wherein when the voltage level of the phase signal outputted by the third output terminal increases to a cut-off voltage of the startup assisting unit, the startup assisting unit automatically stops to operate.

14. An operation method of a voltage regulator according to claim 1, comprising:
detecting a voltage level of the phase signal outputted by the third output terminal of the alternator;
determining whether the voltage level of the phase signal of the alternator is greater than a predetermined voltage threshold; and
when the voltage level of the phase signal is greater than the predetermined voltage threshold, causes a startup assisting unit to generate a first exciting current to a rotor coil of the alternator.

15. The operation method according to claim 14, wherein the step after generating the first exciting current to the rotor coil of the alternator, further comprises:
when the voltage level of the phase signal outputted by the third output terminal rises to a cut-off voltage of the startup assisting unit, the startup assisting unit automatically stops to operate.

* * * * *